United States Patent [19]

Dubay

[11] 3,751,122
[45] Aug. 7, 1973

[54] REPLACEABLE BUSHING FOR SANITARY CONVEYOR

[76] Inventor: Alvin H. Dubay, Rt. 2, Box 3055, Vacaville, Calif. 95688

[22] Filed: Dec. 6, 1971

[21] Appl. No.: 205,034

[52] U.S. Cl.................. 308/63, 193/35 R, 198/184
[51] Int. Cl........................ F16c 25/00, B65g 39/02
[58] Field of Search...................... 308/DIG. 10, 63; 198/204, 184; 193/35 R, 35 C

[56] References Cited
UNITED STATES PATENTS
2,661,829  12/1953  McCann et al. ................ 198/204 X
2,189,143  2/1940  Harris .............................. 193/35 R Primary Examiner—Richard E. Aegerter
Assistant Examiner—James W. Miller
Attorney—Alexander B. Blair

[57] ABSTRACT

A sanitary conveyor for use with food processing machinery and including an endless belt conveyor system. The individual idler support rolls of the conveyor are mounted on bushings having a slip fit on a bracket so that they may be removed and replaced without the necessity of disassembling the conveyor completely.

2 Claims, 19 Drawing Figures

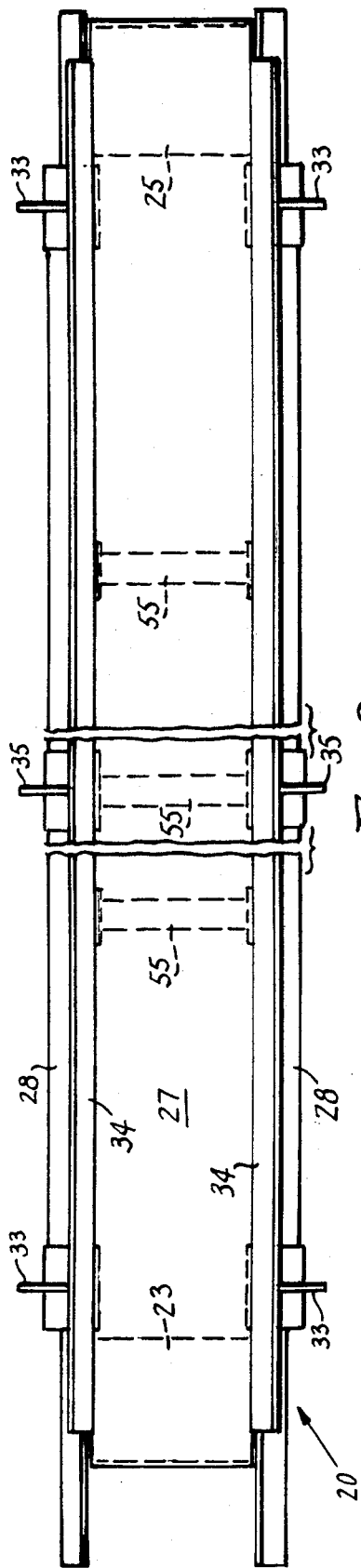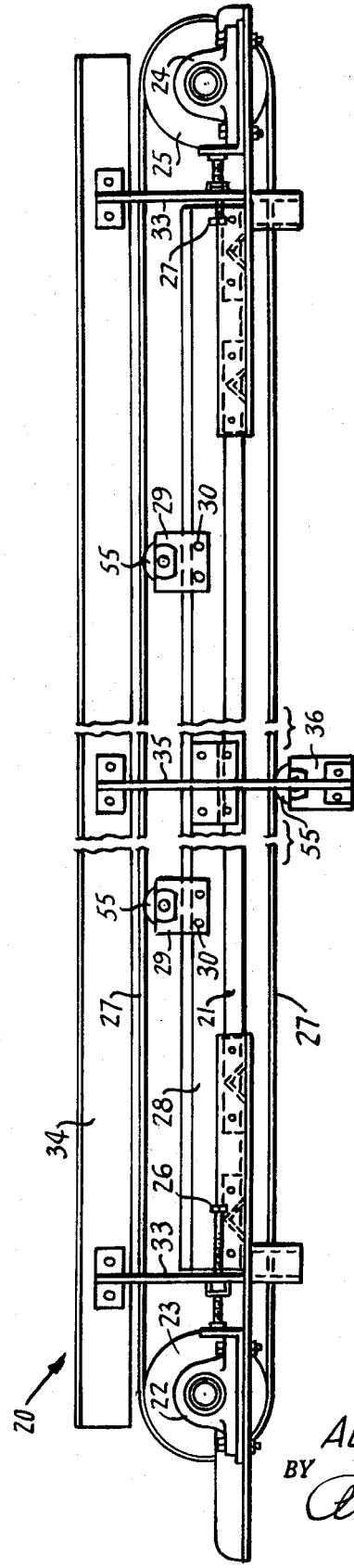

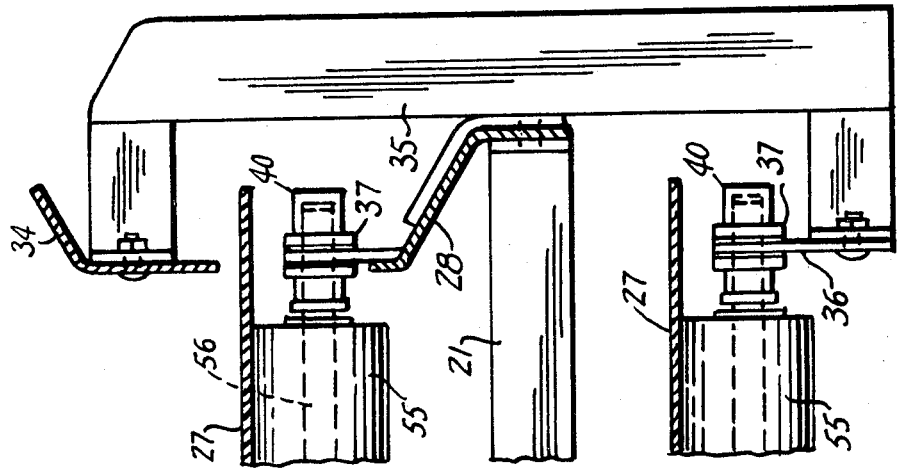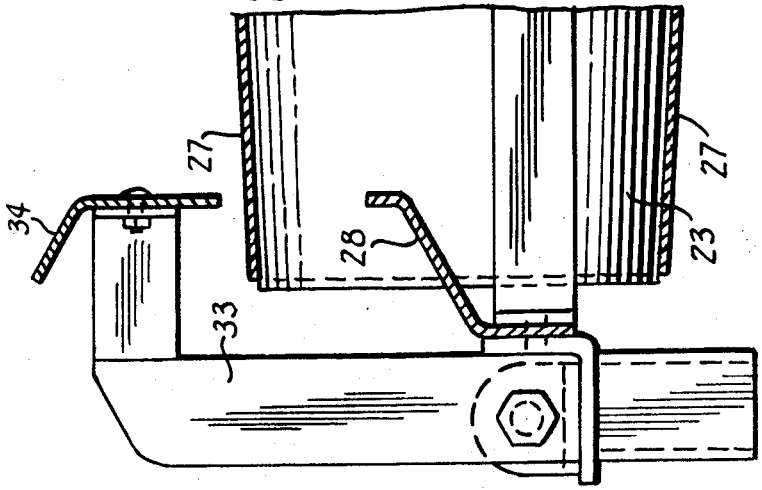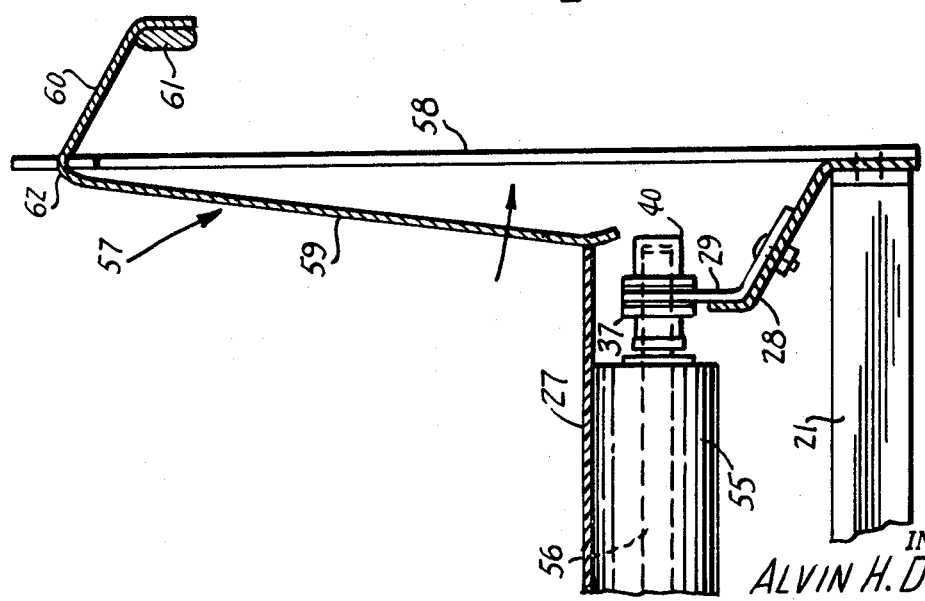

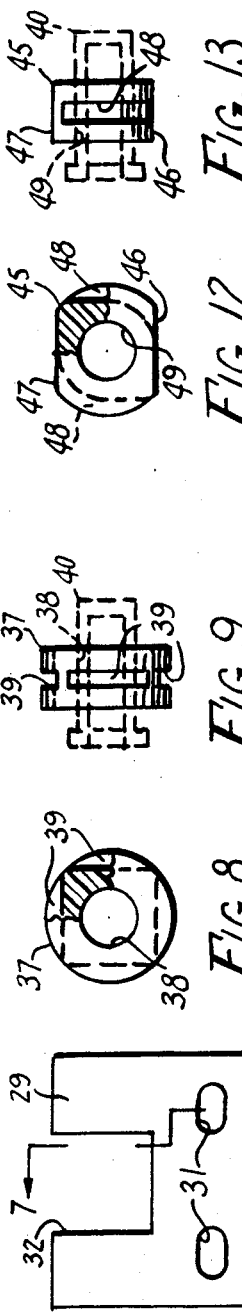

3,751,122

REPLACEABLE BUSHING FOR SANITARY CONVEYOR

BACKGROUND OF THE INVENTION

Field of the Invention

The present invention relates to endless belt conveyors particularly for use with food processing machinery.

SUMMARY OF THE INVENTION

The conveyor of the instant invention is of the endless belt type and includes conventional rolls at its opposite ends with the intermediate upper and lower runs thereof supported on idler rolls. The idler rolls are journaled in bushings which are slip fitted to brackets so as to be removable without tools to replace the bushings and cleanse the rollers as required for sanitary operation of the conveyor.

The primary object of the invention is to provide an endless belt conveyor having the upper and lower runs thereof supported on easily removable idler rolls.

Other objects and advantages will become apparent in the following specification when considered in the light of the attached drawings.

BRIEF DESCRIPTION OF THE DRAWINGS

FIG. 1 is a side elevation of the invention shown partially broken away for convenience of illustration;

FIG. 2 is a top plan view of the structure illustrated in FIG. 1;

FIG. 3 is a fragmentary vertical sectional view taken through one side of the conveyor;

FIG. 4 is an enlarged fragmentary vertical sectional view taken through another portion of the conveyor;

FIG. 5 is a view similar to FIG. 4 of another modified form of the invention;

FIG. 6 is a front elevation of the bushing bracket;

FIG. 7 is a vertical cross-section taken along the line 7—7 of FIG. 6 looking in the direction of the arrows;

FIG. 8 is a side elevation of one of the bushing shown partially broken away and in section for convenience of illustration;

FIG. 9 is a plan view of the bushing illustrated in FIG. 8;

FIG. 10 is a side elevation of another bushing constructed in accordance with the invention shown partially broken away and in section for convenience of illustration;

FIG. 11 is a top plan view of the bushing illustrated in FIG. 10;

FIG. 12 is a front elevation of another bushing used with the invention;

FIG. 13 is a top plan view of the bushing illustrated in FIG. 12;

FIG. 14 is a front elevation of still another bushing used with the invention shown partially broken away and in section for convenience of illustration;

FIG. 15 is a top plan view of the bushing illustrated in FIG. 14;

FIG. 16 is a longitudinal sectional view of the bushing illustrated in FIG. 9;

FIG. 17 is a longitudinal sectional view of the bushing illustrated in FIG. 11;

FIG. 18 is an end elevation of one of the bushing mounts; and

FIG. 19 is an end elevation of another of the bushing mounts.

DESCRIPTION OF THE PREFERRED EMBODIMENT

Referring now to the drawings in detail wherein like reference characters indicate like parts throughout the several figures the reference numeral 20 indicates generally a sanitary food conveyor constructed in accordance with the invention.

The food conveyor 20 includes a generally horizontal frame 21 having at one end a pair of oppositely disposed bearings 22 arranged for longitudinal adjustment on the frame 21. A conveyor belt roller 23 is journaled in the bearings 22 for rotation therein. A second pair of bearings 24 are secured to the frame 21 adjacent the opposite end thereof and have a conveyor belt roller 25 journaled therein. The bearings 24 are mounted on the frame 21 for longitudinal adjustment thereon. An adjusting bolt 26 is secured to the frame 21 and to the bearings 22 to move the bearings 22 longitudinally of the frame 21 as desired. An adjusting bolt 27 is secured to the frame 21 and to the bearings 24 to longitudinally adjust the bearings 24 on the frame 21 as required. An endless conveyor belt 27 is trained over the rollers 23, 25 to serve as a conveyor belt.

A rail 28 is secured to the frame 21 and extends upwardly and inwardly therefrom to underlie the belt 27. A plurality of generally rectangular brackets 29 are secured to the rail 28 by bolts 30 which extend through bores 31 in the bracket 29. A generally rectangular slot 32 opens downwardly in the bracket 29 centrally thereof for reasons to be assigned. An arm 33 is secured to the frame 21 and extends upwardly therefrom to support a side guard 34 secured to its upper end. An arm 35 is secured to the frame 21 and similarly supports the guard 34. The lower end of the arm 35 has a bracket 36 secured thereto and having substantially the same dimensions as the bracket 29 except having a vertical length somewhat greater.

The bracket 29 and the bracket 36 are adapted to receive any one of the bushings illustrated in FIGS. 8 through 17. The bushing 37 illustrated in FIGS. 8 and 9 is of generally cylindrical form and has a central bore 38 extending axially therethrough. A plurality of slots 39 are formed in four faces of the bushing 37 to provide a substantially square core which is adapted to engage in the slot 32 securing the bushing 37 therein. A tubular bearing 40 engages axially in the bore 38 and has a bore 41 therein to support a shaft. It should be understood that the bushing 37 can be mounted in the bracket 29 in any of four positions so as to permit it to be revolved as wear takes place.

In FIGS. 10 and 11 a bushing 42 of generally cylindrical form having an axial bore 43 is illustrated with the bore 43 having a diameter substantially less than the diameter of the bore 38 in the bushing 37. A plurality of slots 44 are formed in the bushing 42 identically to the slots 39 in the bushing 37. The bushing 42 can be revolved to a new position with respect to the bracket 29 when wear occurs. The bore 43 serves as a bearing for a shaft inserted therein.

In FIGS. 12 and 13 a bushing 45 is illustrated having a generally cylindrical form with a flattened lower face 46 and a flattened upper face 47. Oppositely disposed arcuate slots 48 are formed in the bushing 45 to permit the bushing 45 to be engaged in the slot 32 of the bracket 29. A bore 49 extends axially through the bushing 45 to receive a bearing member 40 identical to the bearing member 40 illustrated in FIGS. 8, 9 and 16. The bushing 45 can be rotated in the bracket 29 as desired to present a new wear surface when this is required. In FIGS. 14 and 15 another bushing 50 is illustrated having a generally cylindrical body with flattened lower surface 51 and upper surface 52. An axial bore 53 extends into the bushing 50 to provide a bearing for the shaft mounted therein. A pair of oppositely disposed arcuate slots 54 are formed in the opposite sides of the bushing 50 to permit the bushing 50 to be engaged in the slot 32 of the bracket 29. The bushing 50 may also be revolved in the bracket 29 to compensate for wear.

Idler rolls 55 each have a shaft 56 extending therethrough and into a bearing member 40 at each end supported in a bushing 37. The guide rails 34 overlie the endless conveyor belt 27 to retain material being moved thereon. In FIG. 5 a modification of the guide 34 is illustrated generally at 57. The guide 57 is mounted on an arm 58 which extends up from the frame 21 and has a portion 59 extending downwardly into engagement with the side of the endless belt 27 and a portion 60 extending angularly outwardly therefrom and having a counterweight 61 secured to its outer end. The apex 62 of the guide 57 is mounted for hinging movement on the top of the arm 58 so as to stay in engagement with the conveyor belt 27 except when forced outwardly by large objects moving therealong. The belt support rollers 53 may be cylindrical or tapered as required.

In FIGS. 18 and 19 the bushing 45 is illustrated in two positions of adjustment 180° apart.

In the use and operation of the conveyor 20 the rollers 55 are mounted in any one of the bushings illustrated in FIGS. 8 through 17 and the bushing is slipped downwardly into the notch 32 in the bracket 29 to rigidly support the roller 55 in its conveyor belt supporting position. As the bushing becomes worn it can be slid upwardly out of the bracket 29 and rotated to a different position and then replaced in the bracket 29 until it becomes too worn for further use. When too worn for further use the bushing may be replaced by simply sliding it up out of the bracket 29 without the necessity of using tools of any kind.

Having thus described the preferred embodiments of the invention it should be understood that numerous structural modifications and adaptations may be resorted to without departing from the spirit of the invention.

I claim:

1. A replaceable bushing structure for a sanitary food conveyor of the type including a frame and idler rollers extending thereacross comprising a bracket secured to said frame and extending upwardly therefrom, a generally rectangular slot formed in the upper end of said bracket and opening through the upper end thereof, a bushing having an axial bore extending therethrough for journalling one end of each of said idler rollers, said bushing being of generally cylindrical outer form and having a pair of spaced parallel flat sides formed thereon, said flat sides being spaced apart a distance less than the distance between the sides of said generally rectangular slot in said bracket, and a pair of opposed slots formed in the cylindrical portion of said bushing and each having an eccentrically curved bottom wall extending from the juncture of one end of each of said flat walls and the adjacent cylindrical portion of said bushing and curving inwardly therefrom deeper into said bushing, said pair of slots engaging over the side edges of said slot in said bracket to releasably secure said bushing in said bracket.

2. A device as claimed in claim 1 wherein said pair of slots in said bushing each have parallel side walls with the deeper portion of said eccentrically curved bottom wall extending concentric with said bore.

* * * * *